United States Patent [19]

Rogers

[11] 4,304,371
[45] Dec. 8, 1981

[54] PEELING TOOL FOR INTEGRATED STRIP IN A SHEET METAL COIL CONSTRUCT

[76] Inventor: John W. Rogers, 1975 Gulf of Mexico Dr., Sarasota, Fla.

[21] Appl. No.: 165,874

[22] Filed: Jul. 3, 1980

Related U.S. Application Data

[63] Continuation-in-part of Ser. No. 55,848, Jul. 9, 1979, abandoned.

[51] Int. Cl.³ .............................................. B21C 47/18
[52] U.S. Cl. ...................................... 242/81; 225/103
[58] Field of Search ...................... 242/81, 82, 67.1 R, 242/67.2, 67.3 R; 225/103

[56] References Cited

U.S. PATENT DOCUMENTS

| | | | |
|---|---|---|---|
| 4,191,318 | 3/1980 | Rogers | 225/103 |
| 4,195,759 | 4/1980 | Rogers | 225/103 |
| 4,267,984 | 5/1981 | Box | 225/103 |
| 4,267,985 | 5/1981 | Rogers | 225/103 |

Primary Examiner—Edward J. McCarthy
Attorney, Agent, or Firm—John F. Carney

[57] ABSTRACT

A tool is described which is particularly adapted for detaching by peeling sheet metal strip from a wound construct containing a plurality of coiled strips interconnected by intermittently spaced tabs that bridge the parting lines between adjacent strips. The tool is effective to fracture the tabs without distorting or marring the adjacent strip material.

14 Claims, 8 Drawing Figures

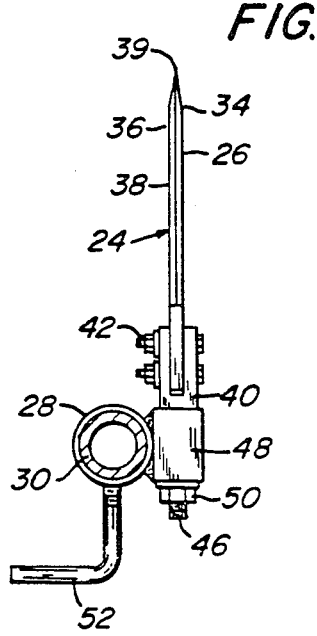
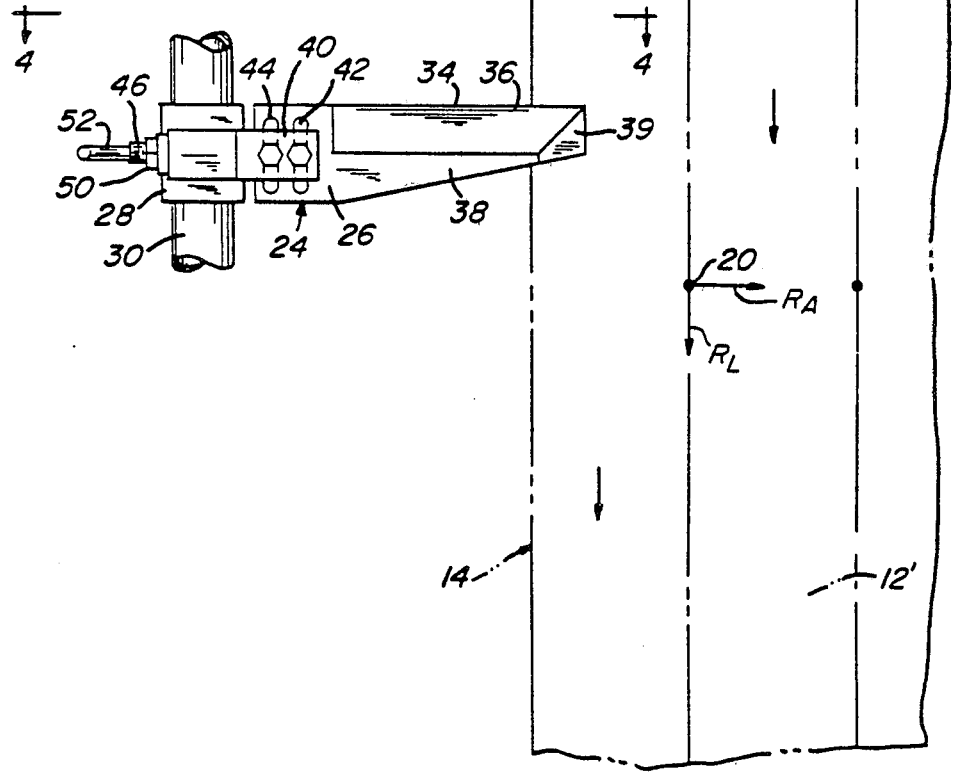

4,304,371

PEELING TOOL FOR INTEGRATED STRIP IN A SHEET METAL COIL CONSTRUCT

PRIOR APPLICATIONS

This application is a continuation-in-part of U.S. Patent Application Ser. No. 55,848 filed Jul. 9, 1979, abandoned.

BACKGROUND

An improved practice for the production of coiled sheet metal strip material is described in U.S. Pat. Nos. 4,170,691; 4,173,313 and 4,155,238 granted Oct. 9, 1979, Nov. 6, 1979 and May 22, 1979, respectively, to applicant herein. According to this improved practice an elongated web of sheet metal is slit along parallel lines in a manner that produces parting lines containing intermittently spaced residuums of only partially sheared metal that bridge the parting line between adjacent strips and interconnect their facing edges. Thus, upon coiling of the slit product there results a wound construct containing a plurality of coiled strips integrally joined by frangible connections or tabs defined by the aforementioned partially sheared residuums of metal.

Constructs produced hereby facilitate shipment and handling of the contained coiled strips since the need to band individual strips as had theretofore been required is avoided. Also, the danger of distorting or marring the edges of individual strips is prevented due to the fact that only the endmost strips are exposed to the danger of damage during handling of the construct.

Detachment of individual strips from the construct can be effected by specialized breakaway devices by means of which a coiled strip is separated intact from the construct by the simultaneous fracture of the tabs connecting the strip thereto. One such device is described in U.S. Pat. No. 4,195,759 granted Apr. 1, 1980. Some applications, however, contemplate peeling individual strips from the construct as, for example, while the construct is rotated and a single strip is fed to a processing station such as a press or punch or the like. In U.S. Pat. No. 4,170,691, there is shown and described a prizing blade that operates to detach individual strips from the construct by shearing the connecting tabs as each strip is peeled from the construct. The described prizing blade is fixedly positioned in alignment with the parting line containing the tabs to be severed and cuts the tabs as each is successively drawn to the blade while the construct is rotated and the strip peeled therefrom.

Detaching the strips in this manner has been determined to be commercially unacceptable, especially when the sheet metal material being operated on is of reduced thickness. This is due to the fact that impacting the tabs upon the blade as is required to effect severance produces bending forces resulting in distortion of the adjacent strip material and otherwise damages the strip thereby precluding its commercial acceptability.

In U.S. Pat. No. 4,170,691 there is also described another form of strip-detaching tool in which the tabs are severed by paying the strip to be separated over a wedge-shaped prizing blade which lifts the object strip with respect to the adjacent strip in order to fracture the interconnecting tabs. Use of this form of tool produces a generally upward force vector at the tab which, due to the fact that the adjacent coils and, concomitantly, the tabs are moving translates into a force system causing the tabs to fracture in torsion thereby producing a cup and point residue that is characteristic of this type of failure. Such residue appears as burrs on the resultant strip and is unacceptable in product of a commercial grade.

It is the solution of the aforementioned problems therefore that the present invention is directed.

SUMMARY

According to the present invention, there is provided an improved method of fracturing tabs for detaching an elongated strip from a wound construct of sheet metal web material having a plurality of laterally spaced, longitudinally extending parting lines defining a plurality of laterally spaced coiled strips, said strips being frangibly interconnected in side-by-side relation by intermittently spaced tabs bridging the parting line between adjacent strips. The method involves rotating said construct in the strip-uncoil direction and diverting the outer edge of the strip to be separated so as to impose internal tensile stresses therein and thereby create a reactive tensile force at each tab of sufficient magnitude to fracture it.

The invention further contemplates improved apparatus particularly adapted for the practice of the described method.

It is accordingly a principal object of the present invention to provide a method of and apparatus for detaching sheet metal strip material from an integrated coil construct without damaging the strip material.

Another object of the invention is to provide a method of and apparatus for fracturing the tabs interconnecting adjacent strips in a sheet metal coil construct in order to produce severed strip material of commercially acceptable quality.

Yet another object of the invention is to provide means for conveniently peeling individual strips from an integrated coil construct in a manner that permits their transfer to a processing station without need for intermediate handling.

For a better understanding of the invention, its operating advantages and the specific objectives obtained by its use, reference should be made to the accompanying drawings and description which relate to a preferred embodiment thereof.

BRIEF DESCRIPTION OF THE DRAWINGS

FIG. 3 is a partial plan view of the strip detaching device in somewhat greater detail;

FIG. 4 is a view taken along line 4—4 of FIG. 3;

DESCRIPTION OF THE PREFERRED EMBODIMENT

Figure 1:
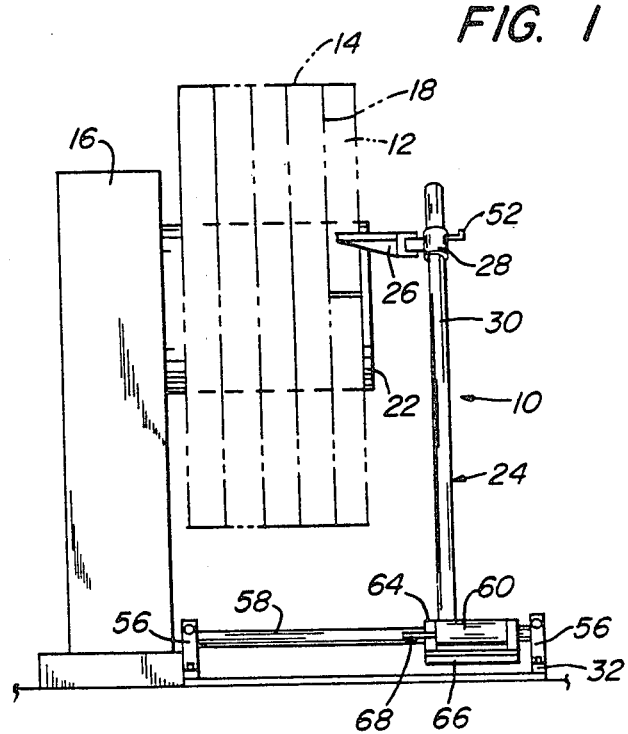
FIG. 1 is a front elevational view of a strip detaching device according to the present invention.
Figure 2:
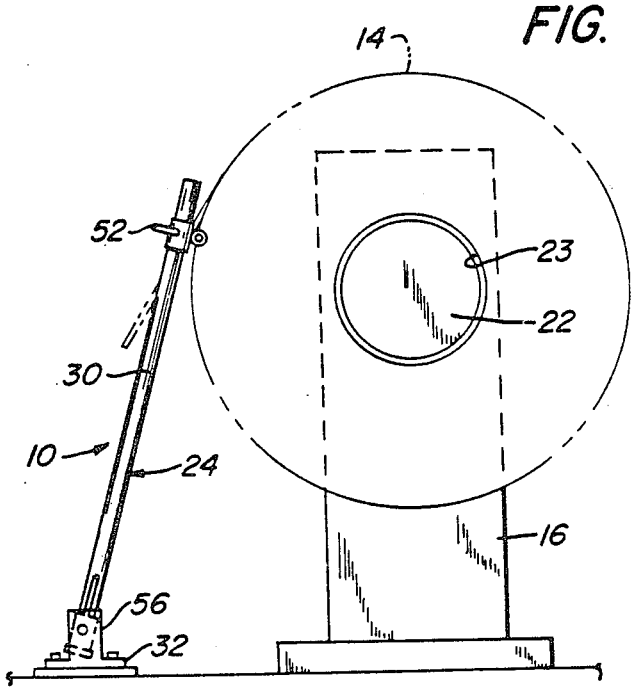
FIG. 2 is a side elevational view of the arrangement shown in FIG. 1.
Figure 5:
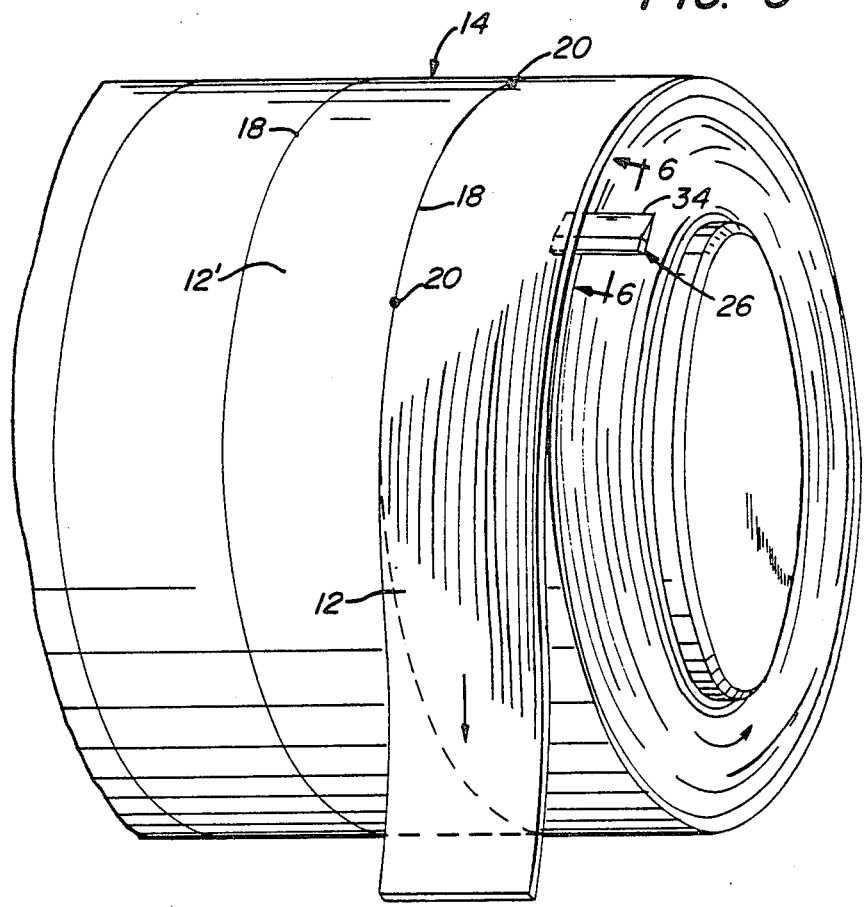
FIG. 5 is a partial perspective view of the device of FIG. 1.
Figure 6:
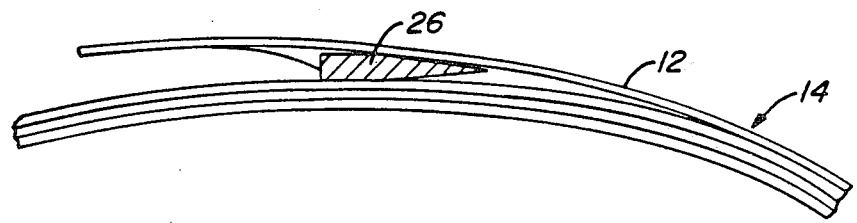
FIG. 6 is a sectional view taken along line 6—6 of FIG. 5.

FIGS. 1 and 2 of the drawing illustrate an arrangement, indicated generally as 10, for peeling individual strips 12 from a sheet metal coil construct 14 that is mounted for rotation on an uncoiling stand 16. The coil construct 14 is of a type described in U.S. Pat. No. 4,170,691, being formed of wound sheet metal web material having a plurality of laterally spaced parting lines 18 in the surface thereof defining frangibly interconnected coiled strips 12 therebetween. The parting lines 18, as best shown in FIG. 3, contain intermittently spaced tabs schematically represented by the marks 20. These tabs are formed of partially sheared residual web material bridging the interstice between adjacent strips and forming the connections therebetween. The construct 14 is fabricated as described in detail in U.S. Pat. No. 4,170,691 by rotating slitting cutters which operate on an elongated web of sheet metal material in a manner whereby, along the parting lines 18, the web is sheared continuously. Over a predominant portion of the length of each parting line 18 shearing extends to a point of severance of the web but at intermittently spaced locations along the parting lines shearing of the web is terminated short of that required for severance of the metal producing a residuum of only partially sheared metal that forms tabs 20 interconnecting adjacent strips 12. The fabricated web is wound upon a coiler with the resultant construct containing several hundred wraps of the wound web material. After coiling, the construct is removed from the coiler in condition for shipment to points of use. Such points of use may be either over long distances by various modes of transportation or to remote locations within the same plant. At the point of use the construct 14 is mounted for uncoiling upon a stand, such as that indicated as 16 in FIGS. 1 and 2, the stand containing a rotatable support 22 for reception in the eye 23 of the construct.

The strip peeling apparatus 24 according to the invention is operative to sever each successive tab 20 connecting a strip 12 to be removed from the remaining construct as the construct is rotated on the stand 16 in the strip-uncoiling direction. The apparatus 24 comprises a finger-like body 26 attached at one end to an adjustable mounting sleeve 28 that is positionable upon an elongated shaft 30. The shaft 30 is, in turn, pivotally mounted on a base 32 to permit the body 26 to be operatively positioned with respect to the construct 14 as hereinafter more fully described.

With particular reference to FIGS. 3 and 4, the body 26 is preferably formed as a blade-like member having its convergent edge 34 disposed in facing relation to the direction of rotation of the construct 14. From the edge 34 the body is provided with an inclined surface 36 leading to a strip-bearing surface 38 across which the strip 12 to be detached crosses as it is peeled from the construct. The particular device illustrated in FIG. 4 is identically formed on the side opposite that shown in FIG. 3 in order to permit the blade to be reversed when it is desired to operate on a construct arranged for rotation in a direction opposite to that of the construct described herein.

The body 26 is attached to a yoke-like blade holder 40 by means of threaded connectors 42 that extend through slots 44 in the body. The blade holder 40 possesses a threaded shaft 46 adapted to extend through an apertured mounting block 48 that is weldedly attached to the mounting sleeve 28. Nut 50 connects the holder 40 to the block 48. The mounting sleeve 28 is slidably retained on the shaft 30, being secured at selected positions therealong by means of a hand-operated set screw 52.

The shaft 30 at its lower end is mounted for pivotal movement upon the stationary base 32 comprised of oppositely spaced upstanding end plates 56 securing an elongated rod 58 therebetween. As shown the lower end of the shaft 30 is provided with an integrally-formed bearing collar 60 that is received on the rod 58 and is permitted to pivot thereabout. The rod 58 also receives a pivot retainer 62 formed of oppositely spaced end plates 64 connected by a bottom brace 66. The retainer is slidable along the rod 58 to permit adjustment of the body 26 in a direction parallel to the axis of the construct 14. A hand-operated set screw 68 similar to that shown at 52 extends through one end plate 64 for locking the retainer in selected positions along the rod 58.

The operation of the hereindescribed strip-peeling apparatus is as follows. With the construct 14 mounted for rotation upon the uncoiling stand 16, the shaft 30 is positioned along the rod 58 to operatively locate the free end 39 of the body with respect to the parting line 18 containing the tabs 20 connecting the strip 12 to be detached to the construct. The shaft is then pivoted into its operative position with the body 28 resting on the surface of the strip 12 on the wrap subjacent that of the free end of the strip. Effective results are achieved with the free end 39 of the body extending inwardly from the strip edge about one-fourth the width of the strip.

As the strip 12 is payed out its outer edge, i.e. the side edge opposite that containing the tabs 20, is caused to pass over the surface 38 of the body 28. This diverts the outer edge of the strip 12 radially upwardly from the circular path traversed by the opposite edge of the strip 12 and the interconnected edge of the adjacent strip 12'. Lifting the edge of the strip 12 in this manner serves to briefly elastically deform the strip material thereby imposing internal tensile stresses on the material that are distributed throughout the plane of the material between two consecutive tabs in the sequence. When such tensile stresses are imposed on the material it will be appreciated that the reaction forces will be concentrated at the tabs 20. These reaction forces are maximized on each successive tab 20 just after it passes the end 39 of the body 26 and occur primarily as an axial tensile force, indicated as $R_A$ in FIG. 3, and a significantly smaller tensile force, $R_L$, longitudinally of the strip. A third, but practically negligible, force occurs normal to the axial and longitudinal forces. The resultant of these forces produces sufficient stress on the tab 20 to fracture it.

The process is continued in connection with each succeeding tab 20 as the strip 12 passes over the body 26 so as to fracture each tab in sequence and effect complete detachment of the strip from the construct.

When it is desired thereafter to peel the adjacent strip 12' from the construct 14, the position of the shaft 30 is adjusted along the rod 58 to locate the leading end 39 of the body 28 adjacent the next parting line 16 with the body resting on the wrap immediately subjacent the free end of the strip 12' and the process repeated.

Figure 7:
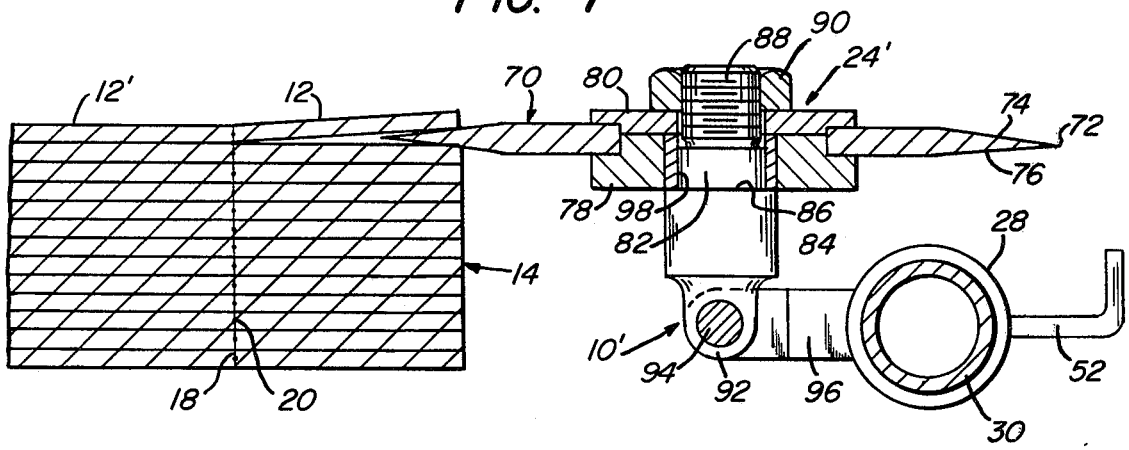
FIG. 7 is a modified form of strip-detaching device according to the present invention.
Figure 8:
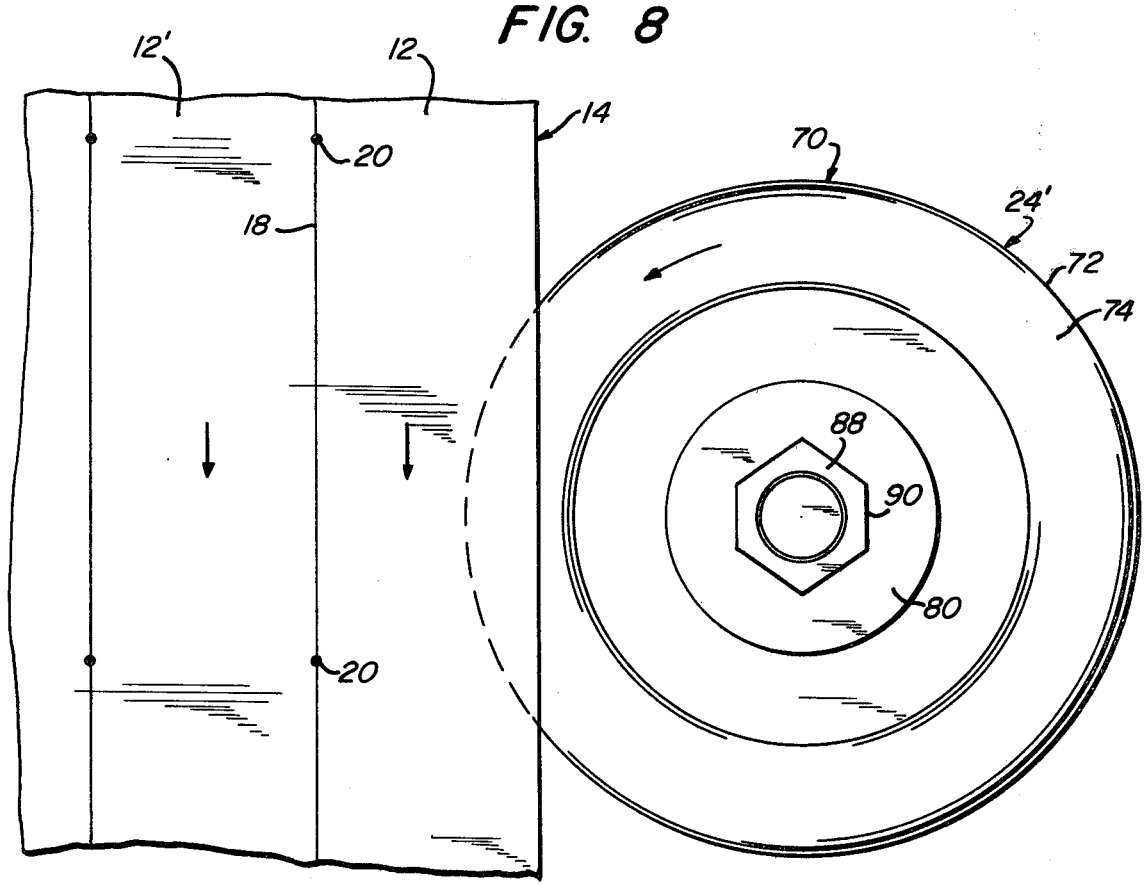
FIG. 8 is a plan view of the device illustrated in FIG. 7.

In FIGS. 7 and 8 of the drawing there is shown a slightly modified embodiment of the invention in which the strip peeling apparatus, indicated as 24', while being operative in essentially the same manner as the blade-like body 28 of the apparatus 24, is formed as a rotatable disc 70 in order to reduce the adverse effects of friction between the peeling apparatus and the surface of the strip material. In this embodiment of the invention, where elements similar to those employed in the earlier described embodiment contain the same numerical designation, the disc 70 is circular and possesses a peripheral edge 72 formed by the convergent surfaces 74 and 76. The disc 70 is attached between the split segments 78 and 80 of a retainer member that is journalled for rotation upon a post 82, the latter being pivotally attached to the slidable sleeve 28 on the shaft 30.

As shown best in FIG. 7, the post 82 is formed as part of a cylindrical body 84 intermediate a larger diameter base portion forming a shoulder 86 for reception of the retainer member 78 and an axially outer threaded portion 88 that receives a nut 90 for securing the disc 70 between the retainer segments 78 and 80. The bottom end of the body 84 is provided with a clevis 92 that is pivotally connected, through pin 94, to a shaft 96 extending radially from the sleeve 28.

The retainer segment 78 may be provided, as shown, with a bushing 98 formed of bronze, or the like, to facilitate rotation of the disc 70 on the post 82.

The operation of this embodiment of the invention in all material respects is the same as that of the apparatus 24 described hereinabove. The shaft 30 is positioned to permit the disc 70 to rest on the coil wrap beneath that being removed with peripheral edge 72 extending inwardly only slightly from the edge of the object strip 12 opposite that bearing the tabs 20. As the object strip 12 is payed across the surface 74 of the disc the resultant diversion produces a tensile strain in the material that is resisted by reactive tensile forces on the tab causing it to fracture.

It will be appreciated that the practice of the herein-described method of fracturing the tabs interconnecting adjacent strips in the coil construct enables the tabs to be broken by imposing tensile strain therein rather than by impacting the tabs on a shearing blade or by imposing a torsional strain thereon through the use of a prizing blade as had heretofore been the practice. Thus, the tabs are no longer subject to any forces tending to bend them leaving the adjacent strip material free of the danger of being distorted or marred by the imposition of such bending forces thereon.

It will be understood that various changes in the details, materials and arrangements of parts which have been herein described and illustrated in order to explain the nature of the invention, may be made by those skilled in the art within the principle and scope of the invention as expressed in the appended claims.

I claim:

1. A method of fracturing tabs for detaching strip from a wound construct of sheet metal web material in which adjacent strips are interconnected by frangible tabs intermittently spaced along the parting line between the facing edges of adjacent strips, comprising the steps of:
   (a) rotating said construct in the strip-uncoil direction; and
   (b) diverting out of the plane of the construct the edge of the object strip opposite the edge containing the tabs to be broken to impose on said strip internal stresses to be resisted at each successive tab by a reactive force of sufficient magnitude to fracture said tab.

2. The method of claim 1 in which said strip edge is diverted by lifting it radially with respect to the construct.

3. The method of claim 2 in which said strip edge is lifted by interposing a body of finite thickness between said strip edge and that of the next subjacent wrap.

4. The method of claim 3 including the step of fixing said body with respect to the movement of said construct whereby said body is disposed in sliding contact with respect to said strip and said subjacent wrap.

5. The method of claim 3 including the step of moving said body in a direction generally coincident with the direction of movement of said strip.

6. In combination with a wound construct of sheet metal web material having a plurality of laterally spaced, longitudinally extending parting lines defining a plurality of laterally spaced coiled strips, said strips being interconnected in side-by-side relation by intermittently spaced tabs bridging the parting line between adjacent strips, means for detaching a strip from said construct by fracturing said interconnecting tabs sequentially along the length of an affected parting line, said means comprising:
   (a) means for rotating said construct in the strip-unwind direction; and
   (b) means for diverting the edge of the object strip opposite that containing said interconnecting tabs along a path of travel outwardly of that traversed by said interconnecting tabs.

7. Apparatus according to claim 6 in which said latter-mentioned means comprises a finger-like body interposed between the outermost wrap of the object strip and the next subjacent wrap, said body extending transversely of said object strip and having its leading end positioned only slightly inwardly of that opposite the edge containing the affected parting line.

8. Apparatus according to claim 7 in which said body has an edge in facing relation to the direction of rotation of said construct formed as an inclined plane.

9. Apparatus according to claim 6 in which said latter-mentioned means comprises a generally circular body rotatable about an axis normal to the axis of rotation of said construct interposed between the outermost wrap of the object strip and the next subadjacent wrap, the periphery of said body extending transversely of said object strip only slightly inwardly from the edge opposite that containing the affected parting line.

10. Apparatus according to claim 9 in which the peripheral edge of said body is formed by converging surfaces.

11. Apparatus according to any one of claims 7 through 10 including means for moving said body radially of said construct in response to diminishment of said construct radius.

12. Apparatus according to claim 11 in which said body moving means comprises:
   (a) an elongated shaft;
   (b) a pivot mount attaching one end of said shaft for pivotal movement; and
   (c) means for securing said body adjacent the free end of said shaft.

13. Apparatus according to claim 12 including means for adjustably securing said body to said shaft.

14. Apparatus according to claim 13 including means for adjusting the position of said pivot mount with respect to the construct axis.

* * * * *